United States Patent [19]

Reeves

[11] Patent Number: 5,263,514

[45] Date of Patent: Nov. 23, 1993

[54] BOOM CONTROL VALVE

[75] Inventor: Kim C. Reeves, Lexington, Tenn.

[73] Assignee: Delavan Inc, West Des Moines, Iowa

[21] Appl. No.: 48,564

[22] Filed: Apr. 20, 1993

Related U.S. Application Data

[63] Continuation-in-part of Ser. No. 951,996, Sep. 28, 1992, abandoned.

[51] Int. Cl.$^5$ .............................. F16K 25/00; F16K 31/06
[52] U.S. Cl. ............................. 137/625.33; 137/625.5; 251/129.07; 251/357
[58] Field of Search .................. 137/625.33, 625.34, 137/625.5; 251/129.08, 282, 357, 129.07, 900

[56] References Cited

U.S. PATENT DOCUMENTS

| | | | |
|---|---|---|---|
| 1,563,385 | 12/1925 | McClymont et al. | 251/357 |
| 2,678,187 | 5/1954 | Peters | 251/357 |
| 2,916,047 | 12/1959 | Butcher | 137/625.34 |
| 2,971,090 | 2/1961 | Piet et al. | 251/357 X |
| 3,123,091 | 3/1964 | Elsey | 137/625.5 |
| 3,985,333 | 10/1976 | Paulsen | 251/129.07 |
| 4,474,358 | 10/1984 | Bennett | 251/357 |

Primary Examiner—Stephen M. Hepperle
Attorney, Agent, or Firm—Howard S. Reiter

[57] ABSTRACT

A control valve assembly designed to allow operation with minimum power requirements and a rapid response to a "shut off" command. The assembly includes a pair of seal elements which operate in tandem. When the valve is open, fluid passes through a series of chambers and as the valve is closed, a substantial passageway allows fluid to bleed quickly to the outlet and reduce pressure to zero almost instantly, thus achieving almost instant shutoff. The dual seal arrangement is also designed so that internal fluid forces are nearly balanced so that minimal external power is required for proper operation.

16 Claims, 4 Drawing Sheets

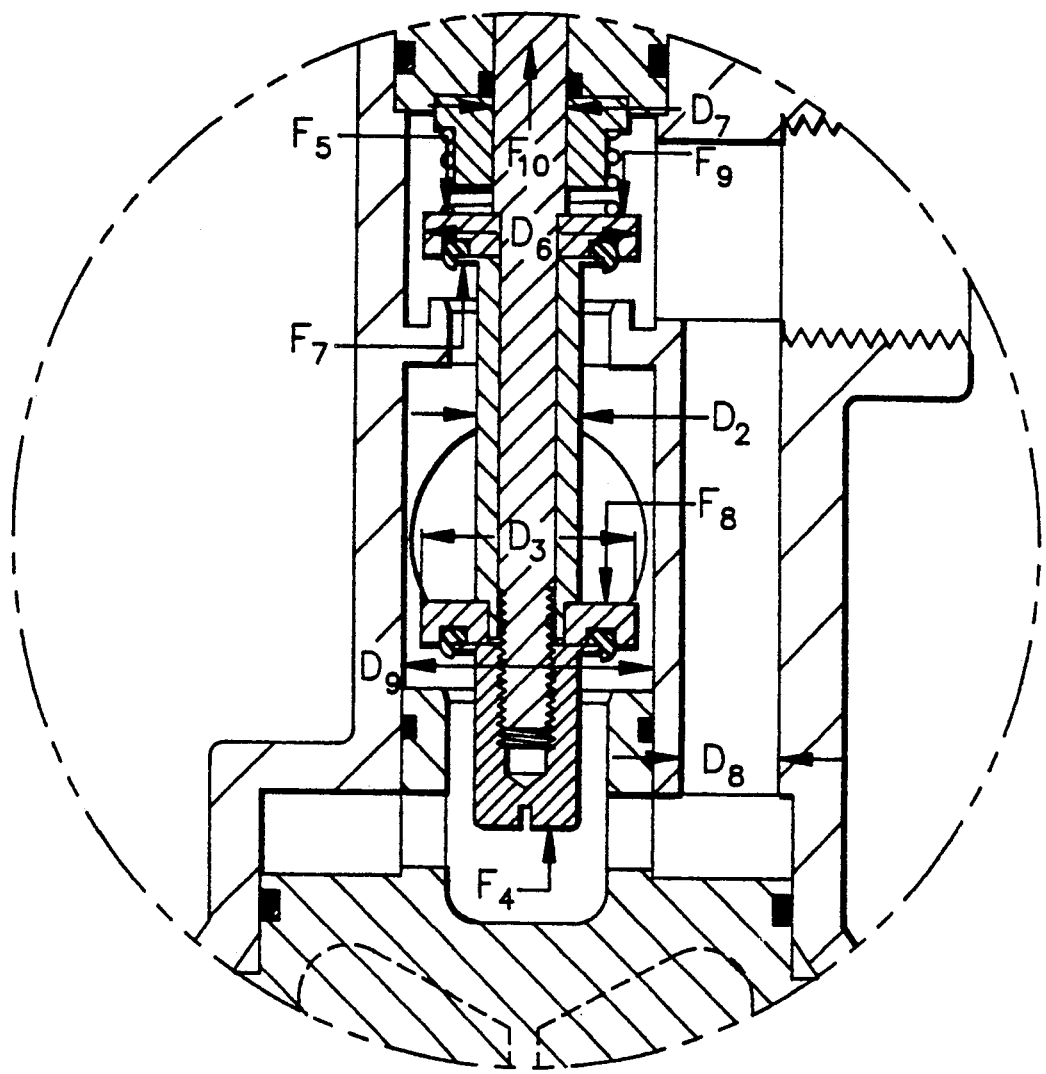
FIG. 1-A

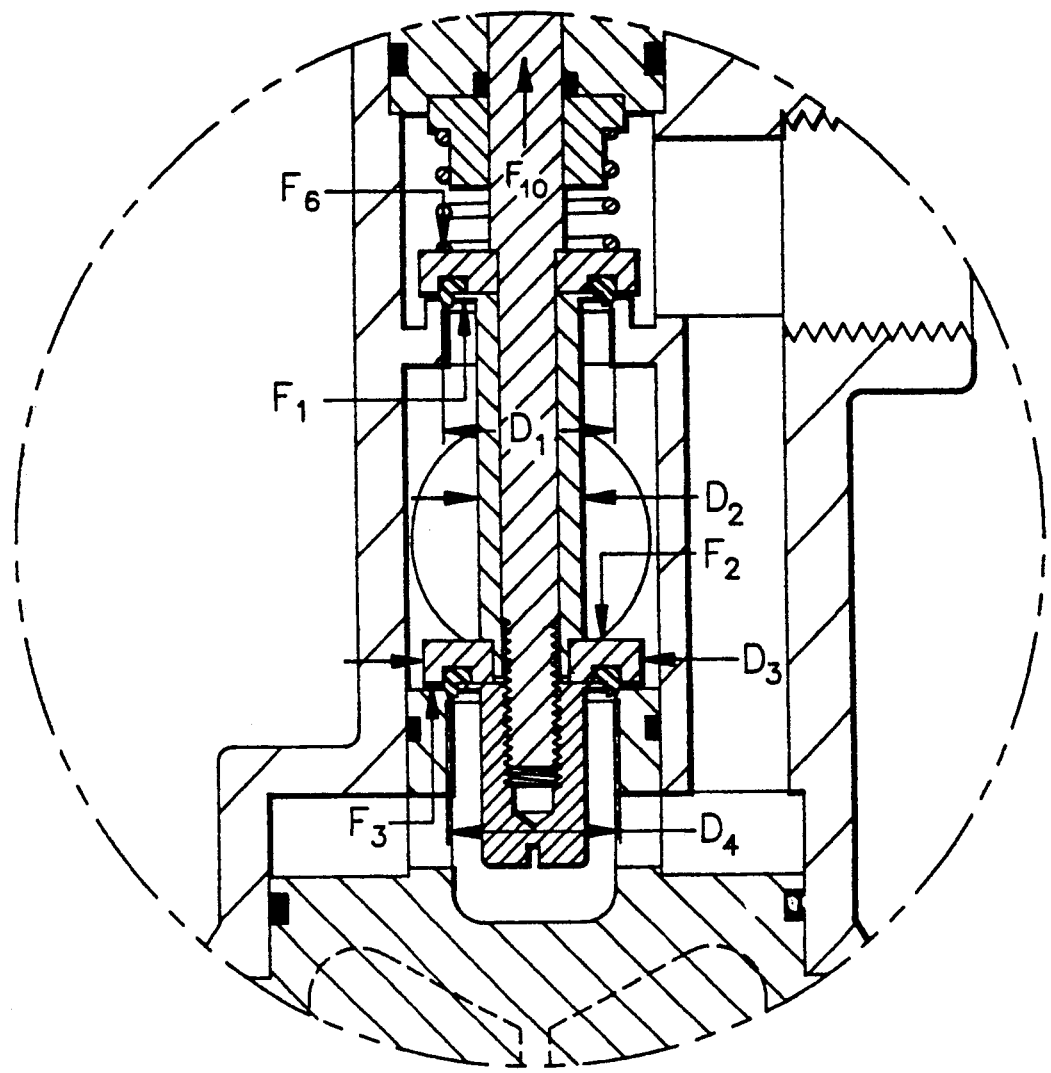
FIG. 2-A

BOOM CONTROL VALVE

This application is a continuation-in-part of application Ser. No. 07/951,996, filed Sep. 29, 1992, now abandoned.

FIELD OF THE INVENTION

The present invention relates to electrically actuated fluid flow control valves which may be remotely controlled. More specifically it relates to remotely actuated valves characterized by minimum actuation-energy requirements and rapid open-close reaction time. Such valves are particularly useful in controlling agricultural spray equipment.

BACKGROUND OF THE INVENTION

The energy required to actuate a flow control valve is directly related to the difference between the fluid pressures acting on opposite sides of the valve sealing member, and to the built-in spring forces (if any) that act to maintain the sealing member in its opened or closed position. Previously, efforts have been made to provide control valves that balance fluid pressures on opposite sides of the sealing member in order to minimize the power required for actuation. For example, U.S. Pat. No. 3,985,333 shows valves having a pair of diaphragms employed to balance the fluid forces. Such diaphragms impose a limit on the fluid pressure that can be controlled and they are costly in time and effort to replace. Some other control valves often require an unacceptably long time to open and/or close.

SUMMARY OF THE INVENTION

In order to overcome these and other problems, the present invention discloses an electrically operated valve including a pair of easily replaced seals which, when open, allow fluid to pass via two paths from the inlet to the outlet. The two sealing members are coupled together to move as a single unit, and they are arranged so that fluid pressure forces tending to unseat the seal members into the opened position are substantially balanced by equal and opposite fluid forces tending to seat the seals into the closed position. As a result of this arrangement, fluid pressure forces within the valve are so balanced that minimal power is required to overcome the slight additional resilient force, such as a helical spring, that is provided to seat the valve seal members securely in their closed position.

It is a primary object of this invention to provide a remotely controlled valve which operates substantially instantaneously and regardless of the fluid pressure or the rate of flow. Another object is to provide a valve having seals which are effective, yet which can be replaced easily.

Another object or feature of the invention is an arrangement that permits a pair of seals to open and close in tandem so as to prevent "chattering" of the valve during pressure equalization as fluid flow is initiated or terminated.

These and other objects, features and advantages of this invention will be made understandable to those having skill in this art by reference to the following specification and claims, and to the accompanying drawings, in which:

BRIEF DESCRIPTION OF THE DRAWINGS

FIG. 1-A is similar to a portion of FIG. 1 except that it is somewhat enlarged and it identifies interrelated diameters and forces when the valve is open.

FIG. 2-A is similar to FIG. 2 except that it identifies additional interrelated diameters and forces when the valve is closed.

DETAILED DESCRIPTION OF THE INVENTION

Figure 1:
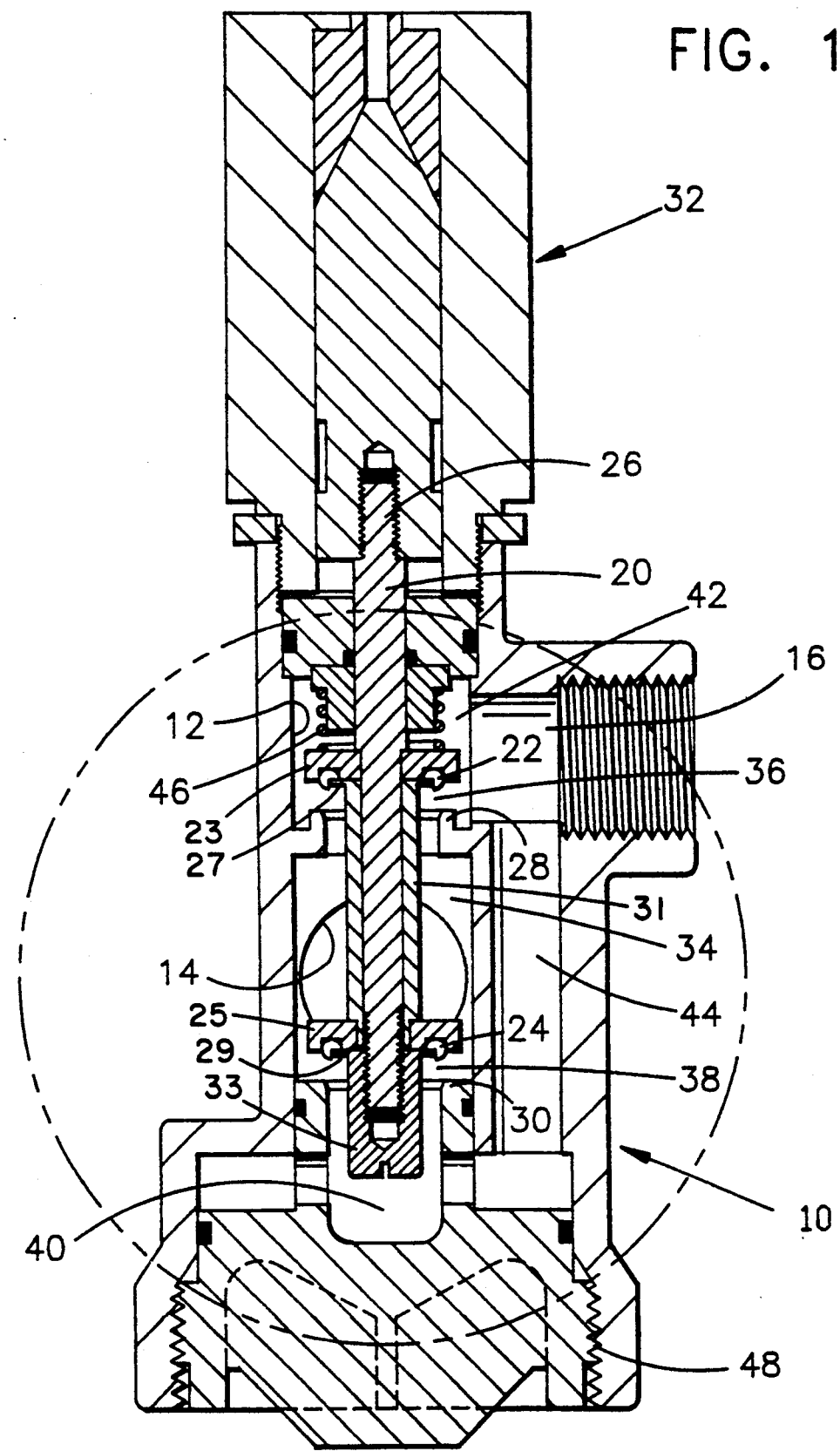
FIG. 1 is a longitudinal cross-sectional view of a valve assembly constructed in accordance with this invention and shown in the open position.

Referring now more particularly to the drawings, the preferred embodiment illustrated may be seen to comprise a valve assembly with a main body member 10 having a central opening 12, inlet means 14 and outlet means 16. Within central opening 12 is disposed a shaft or plunger 20 which carries first and second round-bodied or O-ring seals 22 and 24, respectively. At the free end 26 of shaft 20 is attached means for moving the shaft and its seals 22 and 24 into and out of sealing engagement with first and second sealing shoulders 28 and 30 which extend radially inwardly from said body member. Preferably said shaft moving means consists of a solenoid 32.

In operation, fluid passes through inlet means 14 to first internal chamber 34. As the valve opens, seals 22 and 24 move out of sealing engagement with shoulders 28 and 30 to form first and second seal openings 36 and 38, respectively, and fluid passes through both openings. Thus, some fluid passes from first chamber 34 to second internal chamber 40 and some passes directly to third internal chamber 42 and then to outlet means 16. Fluid which enters second chamber 40 then moves through passageway 44 to outlet means 16. First internal chamber 34 may be considered to be an inlet chamber while second and third chambers 40 and 42 may also be referred to as outlet chambers.

Seals 22 and 24 are seated in recesses of grooves in seal holding members 23 and 25 and are held in place respectively by annular flanges 27 and 29 of seal retainers 31 and 33 which are also carried by plunger 20. Flanges 27 and 29 each compress or pinch a portion of their respective associated seals 22 and 24 and thus slightly reduce the radius of curvature of those seals in the areas which contact shoulders 28 and 30. When the valve is in the closed position, this reduced radius results in a sharper or narrower line contact between the seals and the shoulders, thereby resulting in a seal closing force which is spread over a somewhat smaller area, thus affecting a higher load per unit area and accordingly, a tighter seal for any given closing force. Retainer 31 also serves to maintain the proper axial spacing between the seals 22 and 24 to insure that they engage sealing shoulders 28 and 30 simultaneously.

As the valve assembly opens and closes, various combinations of pressures balance one another as will now be described. When the valve is closed as in FIGS. 2 and 2-A, force $F_2$ tending to hold the valve closed is balanced by forces $F_1$ and $F_3$. All of these forces are factors of inlet pressure and the areas over which that pressure is applied. Thus, the area related to $F_2$ is equal to the sum of the areas relative to $F_1$ and $F_3$. The net result is that the forces cancel one another and there is no net fluid force trying to open or close the valve. Force $F_6$ is the spring force when the valve is closed and force $F_5$ equals the somewhat greater spring load when the valve is open. Thus solenoid 32 need only exert force $F_{10}$ to overcome forces $F_6$ to open the valve and $F_5$ to hold the valve open. In other words:

$$F_{10} > F_5.$$

Figure 2:
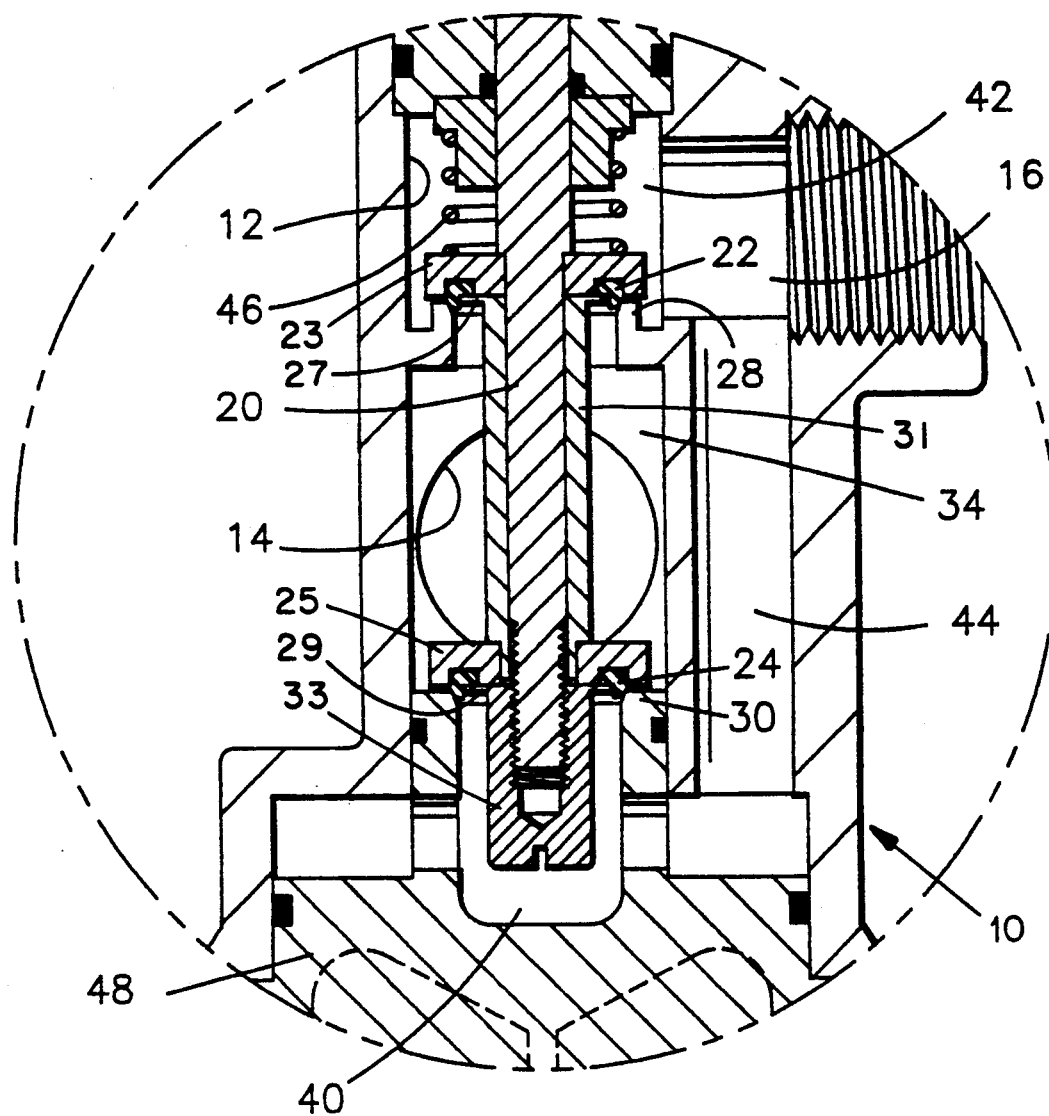
FIG. 2 is a somewhat enlarged longitudinal cross-sectional view of a portion of the valve assembly of FIG. 1 except shown in the closed position.

Referring particularly to FIG. 2-A where the valve is closed, where P equals system pressure and where $D_1$, $D_2$, $D_3$, $D_4$ and $F_6$ are known, equations for the fluid forces are as follows:

$$F_1 = P\frac{\pi}{4}(D_1^2 - D_2^2)$$

$$F_2 = P\frac{\pi}{4}(D_3^2 - D_2^2)$$

$$F_3 = P\frac{\pi}{4}(D_3^2 - D_4^2)$$

In order for the valve assembly to be balanced in the direction of plunger movement (the Y-axis), the sum of the fluid forces acting in the Y-axis direction must equal zero. Thus:

$$F_1 - F_2 + F_3 = 0.$$

$$P\frac{\pi}{4}((D_1^2 - D_2^2) - (D_3^2 - D_2^2) + (D_3^2 - D_4^2)) = 0.$$

By design:

$$D_1 = D_4.$$

Therefore, $$P\frac{\pi}{4}(D_1^2 - D_2^2 - D_3^2 + D_2^2 + D_3^2 - D_1^2) = 0$$

$$P\frac{\pi}{4}(D_1^2 - D_1^2 + D_2^2 - D_2^2 + D_3^2 - D_3^2) = 0$$

$$P\frac{\pi}{4}(0) = 0$$

$$0 = 0.$$

Upon opening of the valve by energizing the solenoid 32, as shown in FIGS. 1 and 1-A, the combination of fluid forces $F_4$ and $F_7$ tending to hold the valve open is nearly balanced by fluid forces $F_8$ and $F_9$ trying to close the valve. Thus, in order to hold the valve in the fully open position, solenoid 32 must only overcome force $F_5$ of the spring 46 minus net force $F_{11}$ tending to hold the valve open. Referring particularly to FIG. 1-A, known values are $D_2$, $D_3$, $D_6$, $D_7$, $D_9$, $F_5$ and $F_{10}$. Thus, if $F_{11}$ equals the sum of forces along the Y-axis due to system pressure P, equations for the fluid forces are as follows:

$$F_{11} = F_4 + F_7 - F_8 - F_9.$$

Where, $$F_4 = P\frac{\pi}{4}D_3^2$$

-continued $$F_7 = P\left(\frac{\pi}{4}D_6^2\right) - P\left(\frac{\pi}{4}D_2^2\right)$$

$$F_9 = P\left(\frac{\pi}{4}D_6^2\right) - P\left(\frac{\pi}{4}D_7^2\right).$$

THEN $$F_{11} = P\left(\frac{\pi}{4}D_6^2\right) - P\left(\frac{\pi}{4}D_2^2\right) + P\frac{\pi}{4}D_3^2 -$$

$$\left(P\left(\frac{\pi}{4}D_6^2\right) - P\left(\frac{\pi}{4}D_7^2\right)\right) -$$

$$\left(P\left(\frac{\pi}{4}D_3^2\right) - P\left(\frac{\pi}{4}D_2^2\right)\right)$$

$$F_{11} = \frac{\pi}{4}P(D_6^2 - D_2^2 + D_3^2 - D_6^2 + D_7^2 - D_3^2 + D_2^2)$$

$$F_{11} = P\frac{\pi}{4}D_7^2.$$

In theory, there is almost no limit to the maximum operating pressure. However, as a practical matter, particularly in portable or moveable equipment such as agricultural spray apparatus, there is a limit determined by the solenoid. Thus, since $F_{11}$ will assist the solenoid in holding the valve open, for any given solenoid force $F_{10}$ the maximum operating pressure will be such that $F_{11}$ is at least differentially less than $F_5$.

As long as the solenoid is energized, the valve remains open and fluid flows from inlet 14, through seal openings 36 and 38 then through outlet chambers 40 and 42 and thence to outlet 16, as for example, on the boom of agricultural spray apparatus.

When solenoid 32 is de-energized, the only remaining force tending to move plunger 20 is the force of spring 46 and thus plunger 20 moves until seals 22 and 24 seat against sealing shoulders 28 and 30, respectively, and the valve closes. This closing takes place quickly since passageway 44 is sufficiently large that the fluid causing $F_4$ is bled back through passageway 44 to outlet 16 very rapidly.

In order to insure this rapid closing of the valve when the solenoid is de-energized, $D_8$ must be large enough that it does not impede fluid flow from chamber 40. Thus, by design, $A_8$ must be equal to or greater than $A_4$. Accordingly, if $A_8$ equals the cross-sectional area of passageway 44 and $A_4$ equals the area of the annular passage between chambers 34 and 40, then $$A_8 = \frac{\pi}{4}D_8^2$$

and $$A_4 = \frac{\pi}{4}(D_9^2 - D_3^2).$$

Accordingly, $$\frac{\pi}{4}D_8^2 \geq \frac{\pi}{4}(D_9^2 - D_3^2)$$

$$D_8^2 \geq D_9^2 - D_3^2$$

-continued $$D_8 \cong \sqrt{(D_9{}^2 - D_3{}^2)}.$$

In an optional design, adjustment means are provided to allow relative movement of the seal shoulders 28 and 30 or the seals 22 and 24 so as to insure simultaneous closing of openings 36 and 38. In this manner, valve chatter or on/off cycling is avoided. In the illustrated embodiment of FIG. 1, the adjustment means comprises threaded connection 48 which permits axial movement of seal shoulder 30 relative to shoulder 28. Similar results, i.e. simultaneous openings and closings, are achieved without such adjustment means if the various valve components are held to close enough tolerances.

It may thus be seen that valves according to the invention are not dependent on system pressure and do not require a minimum flow rate for proper on/off operation as do pilot operated diaphragm valves. Also, there are no small metering passages which would be susceptible to plugging or blockage by particulate material.

While a preferred embodiment of the invention has been shown and described in detail, other modifications will be readily apparent to those skilled in the control valve art. For example, while preferred shaft moving means are electrical, there may be instances when hydraulic or pneumatic means are found to be useful and preferred. Thus, the preceding specification should be interpreted as exemplary rather than as limiting and the scope of the invention as defined by the following claims.

I claim:
1. A control valve assembly comprising:
   a body member having a central plunger-receiving opening therein;
   a plunger disposed within said opening for reciprocal relative motion parallel to the axis thereof;
   a first peripheral sealing shoulder extending radially inwardly from said body means;
   a second peripheral sealing shoulder extending radially inwardly from said body member at a predetermined axial distance from said first sealing shoulder;
   said body member and said shoulders defining a first internal chamber substantially surrounding a portion of the plunger intermediate the ends thereof;
   a pair of seal holding members carried by said plunger;
   a pair of seal retainers carried by said plunger, each having a radial flange;
   first and second round-bodied seals each carried in an annular groove in a face of each of said pair of seal holding members and retained in said grooves in said flanges, said seals being held on said plunger at said predetermined axial distance from each other by one of said seal retainers and being oriented so that they are engaged and disengaged by said first and second peripheral sealing shoulders respectively, in sealing and in open relationships, as said plunger is reciprocated within said plunger receiving opening;
   said body member defining a second internal chamber substantially surrounding a first end portion of said plunger extending from said first internal chamber;
   said body member defining a third internal chamber substantially surrounding a second end portion of said plunger extending from said first internal camber;
   said body member having outlet means for allowing fluid to flow out of said second and third internal chambers to the exterior of said valve assembly;
   said second chamber being connected to said outlet means by a fluid passage having a fluid carrying capacity sufficient to assure that there will be no detectable time lag between a change in the pressure of fluid in one of the chambers and a change in the pressure of fluid in the other one of the chambers;
   said second and third internal chambers being connected to said first internal chamber through first and second seal openings for fluid flow therethrough when said valve assembly is open;
   said body member having inlet means for allowing fluid from an exterior source to flow into said first internal chamber; and
   means for moving said plunger reciprocally within said body member;
   whereby fluid flow between said first internal chamber and said second and third internal chambers is controlled by sealing engagement and disengagement of said first and second peripheral sealing shoulders with said first and second seals.

2. The control valve assembly of claim 1 further including means for adjusting the axial distance from said first sealing shoulder to said second sealing shoulder.

3. The control valve assembly of claim 1 wherein said plunger reciprocating means is a solenoid.

4. The control valve assembly of claim 1 wherein a portion of fluid flow from said second internal chamber to the exterior of said valve passes through said third internal chamber.

5. The control valve assembly of claim 1 wherein a portion of each of said round-bodied seals is pinched by said radial flanges as the valve is closed, whereby the radius of curvature of the seals in the area of engagement with said sealing shoulders is reduced.

6. The control valve assembly of claim 5 further including means for adjusting the axial distance from said first sealing shoulder to said second sealing shoulder.

7. The control valve assembly of claim 5 wherein said plunger reciprocating means is a solenoid.

8. The control valve assembly of claim 5 wherein a portion of fluid flow from said second internal chamber to the exterior of said valve passes through said third internal chamber.

9. A low actuating force valve assembly for controlling flow of pressurized fluid and comprising:
   a housing having a central opening;
   said central opening in said housing defining an inlet chamber and two outlet chambers on substantially opposite sides of said inlet chamber;
   each of said outlet chambers being connected to said inlet chamber by a sealable fluid passage when said valve assembly is open;
   a pair of seal retainers each having a radial flange and being carried by a central plunger positioned in said central opening;
   a pair of round-bodied seals movably mounted on said central plunger, said seals each carried in an annular groove in a face of each of a pair of seal holding members and retained in said grooves by said flanges, said seals being held at said predetermined axial distance from each other by one of said seal retainers and thus positioned to simultaneously engage a pair of sealing shoulders in sealing relationship, in response to movement in a given direction relative to said housing;

means coupled to said plunger and extending externally of said opening in said housing, for selectively and reciprocally moving said plunger and said sealing members relative to said sealing shoulders;

inlet passage means in said housing for admitting fluid under pressure into said inlet chamber;

outlet means in said housing for permitting fluid in said outlet chambers to flow to the exterior of said housing; and connecting passage means coupling one of said outlet chambers to said outlet means independently of said inlet chamber, said connecting passage having a fluid carrying capacity sufficient to assure that no detectable time lag occurs between a change in the pressure of fluid in one of said outlet chambers and a change in the pressure of fluid in the other one of said outlet chambers;

wherein said sealing members are positioned relative to said sealable fluid passage openings so that fluid pressure in said inlet chamber urges one of said sealing members into sealing engagement with its associated sealing shoulder and urges the other one of said sealing members away from sealing engagement with its associated sealing shoulder.

10. The valve assembly of claim 9 further including means for adjusting the axial distance from said first sealing shoulder to said second sealing shoulder.

11. The valve assembly of claim 9 wherein said plunger reciprocating means is a solenoid.

12. The valve assembly of claim 9 wherein a portion of fluid flow from said second internal chamber to the exterior of said valve passes through said third internal chamber.

13. The valve assembly of claim 9 wherein a portion of each of said round-bodied seals in pinched by said radial flanges as the valve is closed, whereby the radius of curvature of the seals in the area of engagement with said sealing shoulders is reduced.

14. The valve assembly of claim 13 further including means for adjusting the axial distance from said first sealing shoulder to said second sealing shoulder.

15. The control valve assembly of claim 13 wherein said plunger reciprocating means is a solenoid.

16. The control valve assembly of claim 6 wherein a portion of fluid flow from said second internal chamber to the exterior of said valve passes through said third internal chamber.

* * * * *